Jan. 24, 1967 W. R. WANESKY 3,299,502
METHODS AND APPARATUS FOR ASSEMBLING ARTICLES
Filed Oct. 1, 1964 3 Sheets-Sheet 1

INVENTOR
W.R. WANESKY
By J. L. Landis
ATTORNEY

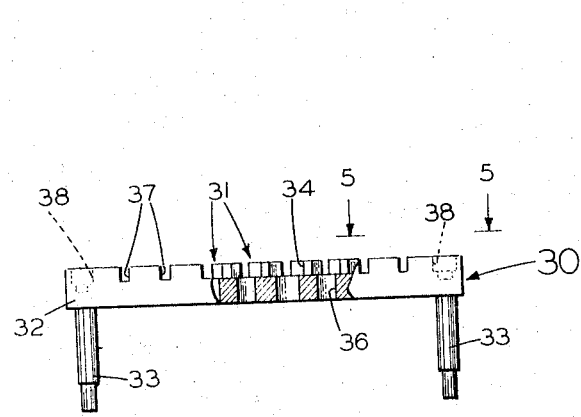
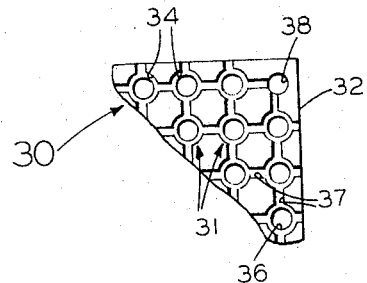
FIG.-4
FIG.-5
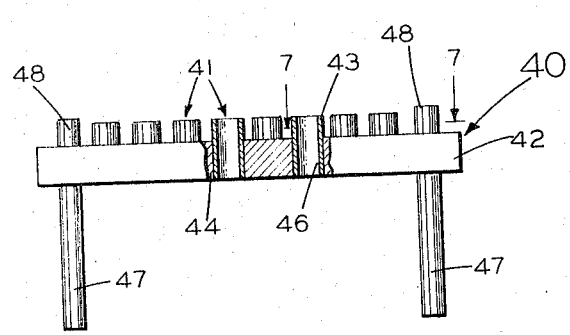
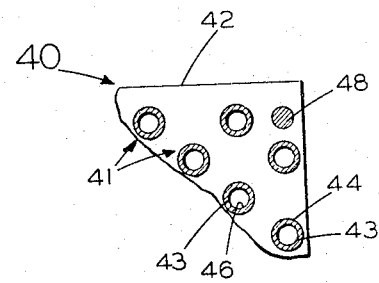
FIG.-6
FIG.-7
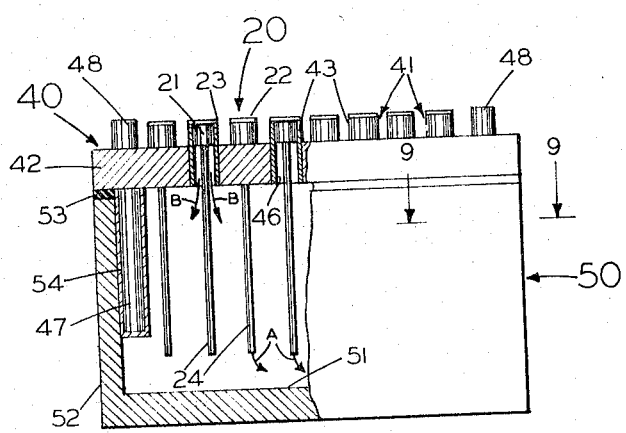
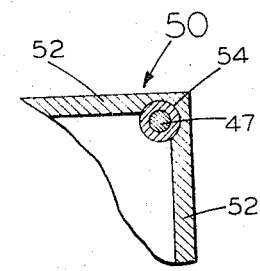
FIG.-8
FIG.-9

United States Patent Office 3,299,502
Patented Jan. 24, 1967

3,299,502
METHODS AND APPARATUS FOR ASSEMBLING ARTICLES
William R. Wanesky, Emmaus, Pa., assignor to Western Electric Company, Incorporated, New York, N.Y., a corporation of New York
Filed Oct. 1, 1964, Ser. No. 400,823
9 Claims. (Cl. 29—464)

The present invention relates generally to methods of and apparatus for assembling articles, and more particularly to the assembly of an article and an open can having a small hole in the base thereof in such a manner that a portion of the article is received to a predetermined depth in the can. Accordingly, the general objects of the invention are to provide new and improved methods and apparatus of such character.

While the principles of the invention may be utilized to assemble various different types of parts having the requisite configuration, the invention is particularly adapted to the assembly of a transistor header with a canlike enclosure designed to cover the header platform and be welded to the header. The can and header have contacting flanges designed to limit the depth of insertion of the header into the can and to be welded together to seal the units. In many instances, the can is formed with a rigid tube secured to the base thereof and communicating with a small hole in the base of the can, to apply a vacuum to the transistor after the welding step, the tube being later sealed off.

Another object of the invention is to provide simple and economical methods and apparatus for assembling a transistor header and a tubulated can as described in the preceding paragraph.

Another object of the invention is to provide such an assembly system, wherein a large number of units may be assembled at the same time and wherein, in the process, the headers are removed from closely spaced nests in a work holder.

The foregoing and other objects are accomplished, in accordance with certain features of the invention, by placing an open-ended can to be assembled on a carrier having a seat designed to support the can with the open end up. The base of the can, including a small hole in the bottom, is exposed beneath the carrier. Next, a partial vacuum is applied to the base of the can sufficient to hold the can against the carrier, while permitting a small stream of air to flow through the hole in the base of the can. When this has been done the carrier, with the can held thereagainst, is moved into proximity with the article in mutual alignment such that the open end of the can receives a portion of the article therein. The can and the article are provided with portions designed to contact each other and form an air-tight seal when the article has been received to a predetermined depth in the can. At this time, the article is held against the can by vacuum drawn through the hole in the can. Next, the carrier is returned to its initial position so that the article is supported by the can and projects upward therefrom. Finally, the partial vacuum is released to permit the removal of the assembled article and can from the carrier.

Preferably, when a tubulated can is involved, the carrier comprises a flat tray having depending legs for supporting the same, the legs being a predetermined amount shorter than the length of the tube extending below the tray. With this arrangement, after the partial vacuum has been released, the tray may be set on its legs on a flat supporting surface, which pushes up on the tube until the length of the tube extending below the tray is equal to the length of the legs. This moves the can part way out of the seat in the tray so as to facilitate removal of the assembled article and can from the tray. Also, a plurality of the articles and cans may be assembled at the same time, by arranging a plurality of seats on the carrier in a pattern based on the arrangement of a plurality of nests in a work holder in which the articles are initially seated.

Other objects, advantages and features of the invention will be apparent from the following detailed description of a specific embodiment thereof, when taken in conjunction with the appended drawings, in which:

FIG. 4 is a front view, partly in section, of the work holder alone, as viewed from the right in FIG. 3;

FIG. 5 is a top view of one corner of the work holder, looking along the line 5—5 of FIG. 4;

FIG. 6 is a front view, partly in section, of the carrier alone, in position to receive a plurality of cans to be assembled;

FIG. 7 is a top horizontal section of one corner of the carrier, taken generally along the line 7—7 in FIG. 6;

FIG. 8 is a front view, partly in section, of the vacuum chamber with the carrier placed thereon;

FIG. 9 is a top horizontal section of one corner of the chamber, taken generally along the line 9—9 of FIG. 8;

Figure 1:
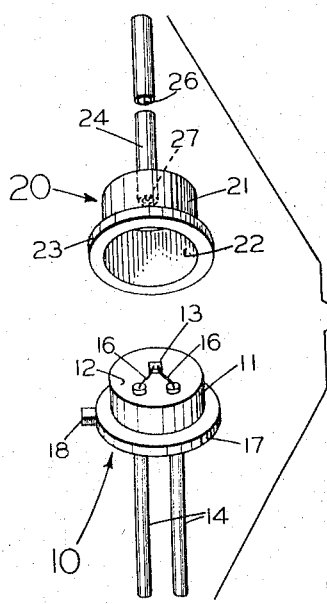
FIG. 1 is an enlarged perspective view of a transistor header and a tubulated can to be assembled in accordance with the invention.
Figure 2:
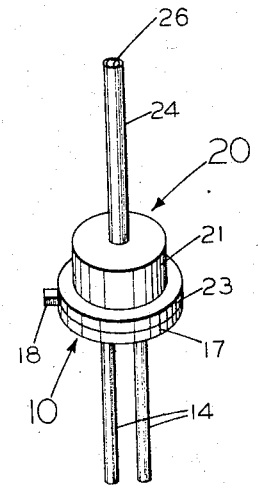
FIG. 2 is a perspective view of the assembled unit consisting of the header and the can.
Figure 3:
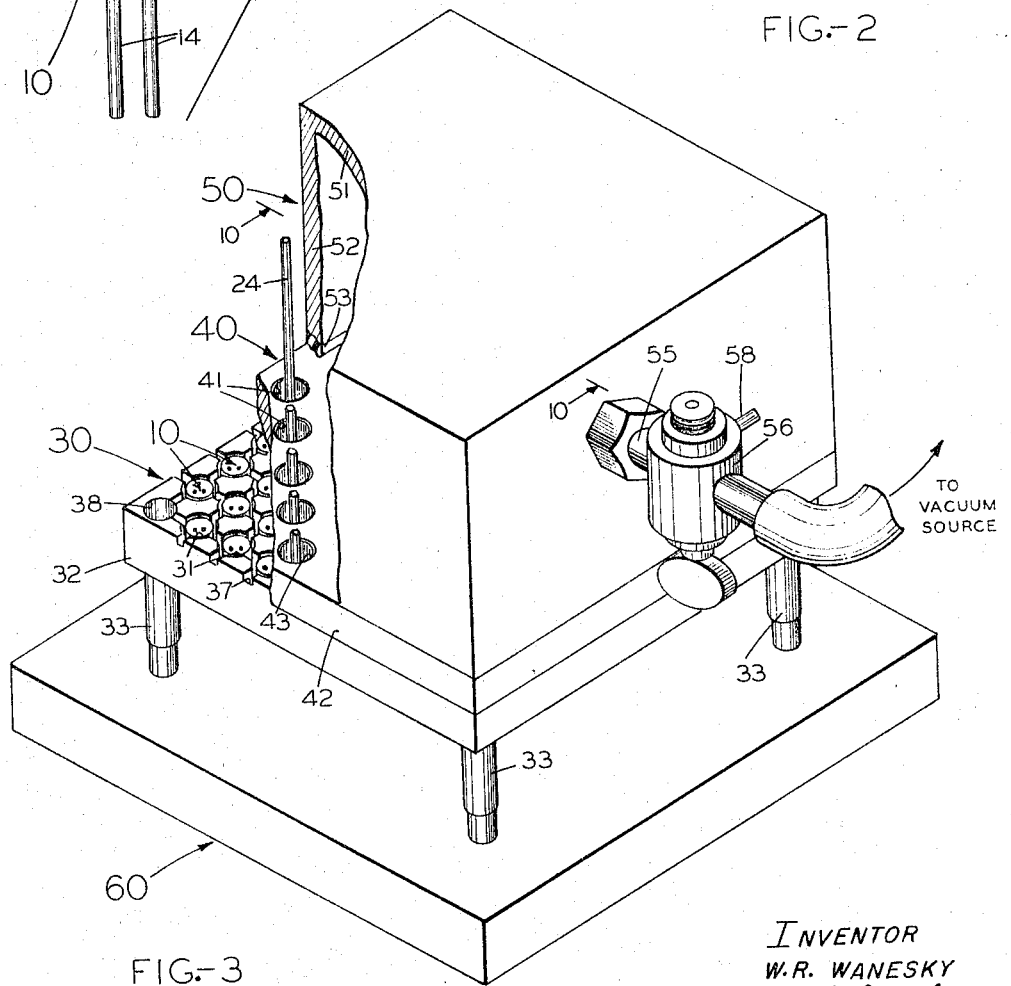
FIG. 3 is a perspective view, with portions broken away, illustrating an assembly of the work holder for the headers, a carrier for the cans, and a vacuum chamber, in position to remove the headers from the work holder.

Referring now in detail to the drawings, and particularly to FIGS. 1 and 2, the illustrative embodiment of the invention concerns methods and apparatus for assembling a plurality of transistor headers 10—10, one of which is shown greatly enlarged in FIG. 1, with a plurality of tubulated cans 20—20 in the manner illustrated in FIG. 2. Referring to FIG. 3, the basic components of the system include (1) a work holder 30 having a plurality of nests 31—31 within which the headers 10—10 are initially received, (2) a carrier 40 having a plurality of seats 41—41 for receiving the cans 20—20, and (3) a vacuum chamber 50 on which the carrier 40 is placed. A partial vacuum applied to the chamber 50 functions initially to hold the cans 20—20 against the carrier 40 and, later, to hold the headers 10—10 against the cans 20—20 in accordance with the principles of the invention.

The specific structure of the headers 10—10 and tubulated cans 20—20 to be assembled and the arrangement of the headers in the work holder 20 is described in detail in the following sections I to III, the carrier 40 and vacuum chamber 50 are described in sections IV and V, the method of operation is described in section VI, and some alternative arrangements are set out in section VII.

I. *Structure of header 10—10*

Referring again to FIG. 1, each of the headers 10—10 includes a cylindrical head portion, termed a "platform" 11, generally in the shape of an inverted cup having a flat upper surface 12 to which a semiconductive wafer 13 is bonded. A pair of leads 14—14 extend through spaced holes in the platform 11 and are mechanically connected thereto and insulated therefrom by a glass bead (not shown) within the platform. A pair of extremely fine gold wires 16—16 are bonded between selected areas of the wafer surface and the upper ends of the leads 14—14, which serve as terminal posts.

The header 10 further includes an enlarged circular flange 17 at the base of the platform 11, which is provided with a locating tab 18 projecting therefrom to provide for orientation of the header during manufacture and for subsequent identification of the individual leads 14—14.

II. *Structure of tubulated cans 20—20*

Each of the tubulated cans 20—20 includes a body portion 21 in the shape of a cylindrical can having an open end 22 within which the platform 11 of a header 10 is designed to be inserted in accordance with the invention. An enlarged circular flange 23 is formed at the open end of the can 20 of the same diameter as the header flange 17. The flanges 17 and 23 contact each other when the header and can have been assembled as shown in FIG. 2, to limit the reception of the header 10 in the can 20 to a predetermined depth such that the wafer 13 is spaced from the closed end of the can. After assembly, the flanges 17 and 23 are welded together to seal the unit.

The can 20 is also provided with a rigid tube 24 projecting axially therefrom at the base of the can (the end opposite to the open end 22). The tube 24 has a small passageway 26 therethrough which communicates with a small hole 27 (see also FIG. 11) at the base of the can body 21 so as to permit the application of vacuum to the header and can after the welding operation. After the vacuum application, the tube 24 is pinched off a short distance above the can 20 to seal the unit permanently.

III. *Arrangement of headers in work holder 30*

Figure 10:
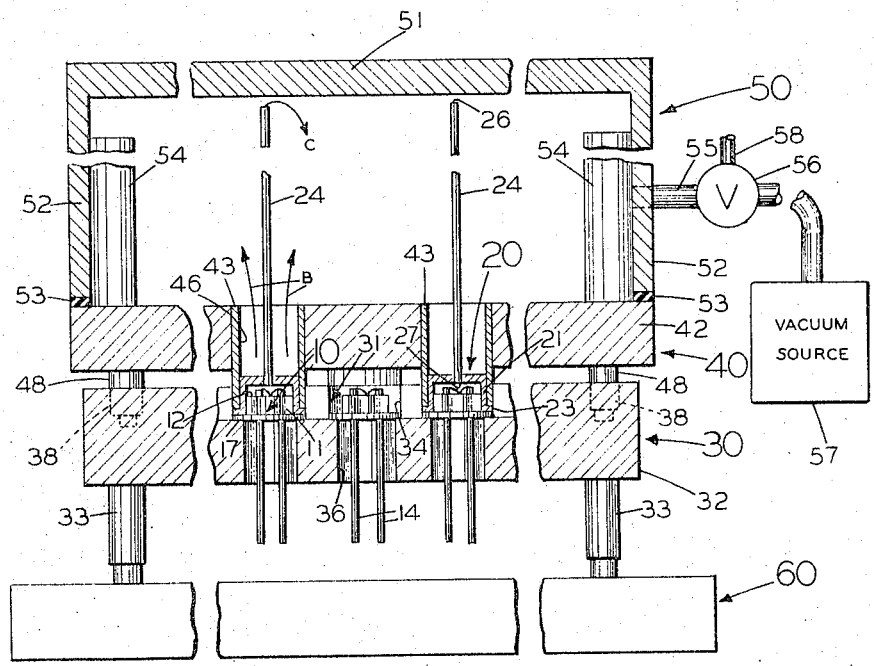
FIG. 10 is an enlarged, broken, vertical section of the assembly shown in FIG. 3, taken generally along the line 10—10 of FIG. 3.

As previously mentioned, and as indicated fragmentarily in FIG. 3, a plurality of the headers 10—10 are initially seated in nests 31—31 in the work holder 30, which is illustrated separately in FIGS. 4 and 5. At this point in the manufacturing process, the fabrication of the headers is complete, the previous step having been a baking operation in which the work holder 30 is used to support the headers with the upper surfaces 12—12 exposed. Referring to FIGS. 4 and 5, the work holder 30 comprises a flat plate 32 mounted on four supporting legs 33—33 at the corners of the plate. Referring to FIG. 10, the legs 33—33 are long enough that the depending leads 14—14 of the headers 10—10 terminate a short distance above the upper surface of a table 60 on which the various parts are mounted.

The nests 31—31 are shaped in accordance with the configuration of the headers 10—10 to support the headers by the flanges 17—17 with the upper surfaces 12—12 of the headers located below the upper surface of the work holder 30, as illustrated in FIG. 10, to avoid possible damage to the headers. For this purpose, each of the nests 31—31 includes a cylindrical well 34 for receiving the flange 17 and platform 11 for sliding movement of the header into and out of the nest 31. A bore 36 of smaller diameter than the well 34 is provided below the well to receive the leads 14—14. The locating tabs 18—18 are received within one of a plurality of slots 37—37 (FIG. 5) provided between adjacent wells 34—34 to position the headers 10—10 securely in the nests 31—31 and prevent rotation of the headers in the work holder 30.

Preferably, the nests 31—31 are very closely spaced, as indicated in FIGS. 3 and 5, to provide for the simultaneous treatment of a large number of headers 10—10 in a minimum amount of space. This is a highly efficient arrangement for mass processing operations such as baking. In the specific example, the nests 31—31 are arranged in a closely spaced square grid pattern such as illustrated in FIGS. 3 and 5. In this example, 96 headers are processed at a time, there being ten rows of ten nests each, with the four corners having blind locating holes 38—38 (instead of nests 31—31) to provide for precise orientation of the carrier 40 with respect to the work holder 30, as will be described hereinafter. This also allows stacking of the work holders 30—30 in the oven, as the lower ends of the legs 33—33 of each holder are designed to fit in the locating holes 38—38 of the other holders.

The assembly apparatus to be described in the following sections is designed for simultaneously coupling a plurality of the tubulated cans 20—20 with a selected group of the headers 10—10, while at the same time removing the headers from the nests 31—31.

IV. *Carrier 40*

Referring to FIG. 8, a plurality of the tubulated cans 20—20 are placed on the carrier 40, which is illustrated separately in FIGS. 6 and 7. The carrier 40 is formed with a plurality of spaced seats 41—41 which, in the initial position of the carrier shown in FIGS. 6 and 8, are designed to support a plurality of the cans 20—20 by their flanges 23—23 with the open ends 22—22 of the cans up. The seats 41—41 are arranged on the carrier 40 in accordance with the spacing of the nests 31—31 on the work holder 30 so that a plurality of the cans 20—20 may be aligned with a selected group of the headers 10—10 by inverting the carrier from the initial position shown in FIGS. 6 and 8 to the "pick-up" position of FIGS. 3 and 10.

The carrier 40 includes a flat square tray 42 slightly larger than the work holder 30, on which are mounted a plurality of cylindrical sleeves 43—43 constituting the seats 41—41 in the illustrative embodiment of the invention. As illustrated in FIG. 6, the sleeves 43—43 are secured in a plurality of holes 44—44 formed in the tray 42, so that the lower end of each sleeve 43 is flush with the under surface of the tray 42. The lengths of the sleeves 43—43 is set so that their upper ends project a predetermined distance above the upper surface of the tray 42, this distance being approximately equal to the length of the can body 21. Each sleeve 43 is formed with a cylindrical bore 46 of a diameter sufficient to receive a can body 21 fairly closely therein and a wall thickness sufficient to support the can flange 23 on the sleeve 43, as viewed in FIG. 8. The outer diameter of each sleeve 43 is the same as, or slightly smaller than, the diameter of the flange 23 supported thereon, so that both the flange 23 and sleeve 43 may be inserted into one of the cylindrical wells 34—34 of the work holder 30 in the inverted position of the carrier 40 illustrated in FIG. 10.

The carrier 40 is provided with a set of four depending legs 47—47 at the four corners of the tray 42, which function to support the carrier and to mount the same on the vacuum chamber 50 as will be described in the next section. Also, the carrier 40 is provided with a set of four locating pins 48—48 (constituting extensions of the legs 47—47 in the specific embodiment) which are spaced to coincide with the blind locating holes 38—38 of the work holder 30 to permit precise alignment of the carrier 40 with the work holder 30 when the carrier 40 is inverted and moved to the pick-up position shown in FIGS. 2 and 10.

V. *Vacuum chamber 50*

Referring to FIGS. 8 and 9, the vacuum chamber 50 comprises an open box having a flat bottom 51 and side walls 52—52. The length and width of the chamber 50 are approximately equal to the length and width of the carrier 40, so that the carrier tray 42 may be placed on top of the chamber 50 with the bottom surface of the tray 42 contacting the upper surfaces of the side walls 52—52 to seal the two units together as illustrated in FIG. 8. A rubber gasket 53 is provided along the upper surfaces of the chamber 50 to provide an effective vacuum seal between the carrier 40 and the chamber 50.

The chamber 50 is also provided with a set of four locating sleeves 54—54 at the four corners thereof to receive the carrier legs 47—47, as indicated in FIG. 9, so as to align the carrier 40 with the chamber 50.

A tube 55 (FIG. 3) extends through one of the side walls 52 of the chamber 50, and may be connected by a valve 56 to either a source of vacuum 57 (indicated schematically in FIG. 10) or to an air vent 58.

VI. *Method of operation*

The first step in the method is to place the carrier 40 on the chamber 50 in the position illustrated in FIG. 8, with the carrier legs 47—47 entering the locating sleeves 54—54 of the chamber 50 to align the two units. Next, a plurality of the tubulated cans 20—20 are placed in the sleeves 43—43 of the carrier 40, such that the open ends 22—22 of the cans are up, the can flanges 23—23 are seated against the upper ends of the sleeves 43—43, and the tubes 24—24 extend down through the sleeve bores 46—46 to positions near the bottom 51 of the chamber 50. The depth of the chamber 50 is not particularly critical, so long as it is sufficient to receive the tubes 24—24 in spaced relation from the bottom 51.

When all of the sleeves 43—43 have been filled with cans 20—20, the valve 56 is closed to apply a partial vacuum from the source 57 to the chamber 50. The vacuum must be of sufficient strength to hold the carrier 40 against the chamber 50 to hold each of the cans 20—20 against the carrier 40, while permitting small streams of air (indicated by the arrows A—A in FIG. 8) to flow through the holes 27—27 in the bases of the cans 20—20 and out through the tubes 24—24. The bases of the cans 20—20 are exposed beneath the carrier 40, in the sleeve bores 46—46, so that the vacuum can draw against the base of each can (as indicated by the arrows B—B in FIGS. 8 and 10) to draw the cans 20—20 down against the sleeves 43—43 and form air-tight seals between the can flanges 23—23 and the sleeves 43—43.

After this initial vacuum-sealing step has been accomplished, the chamber 50 is inverted from the loading position shown in FIG. 8, with the carrier 40 and cans 20—20 held securely thereagainst by the vacuum, and is moved down on top of the work holder 30 to the pick-up position shown in FIGS. 3 and 10. The carrier 40 is aligned with the work holder 30 such that the locating pins 48—48 of the carrier enter the locating holes 38—38 of the work holder to precisely orient the units. As the carrier 40 moves toward the work holder 20, the open ends 22—22 of the cans 20—20 enter the wells 34—34 of the work holder and receive the header platforms 11—11 until the can flanges 23—23 contact the header flanges 17—17 to prevent further movement of the carrier 40 toward the work holder 20. As the flanges 23 and 17 contact each other, an air-tight seal is formed between the headers 10—10 and the cans 20—20, after which the headers are held against the cans by vacuum drawn through the tubes 24—24 and the holes 27—27 in the bases of the cans 20—20 (indicated by the arrow C in FIG. 10).

As previously mentioned, the number and spacing of the sleeves 43–43 is set in accordance with the number and spacing of the nests 31–31 in the work holder 30, so that a desired number of the headers 10—10 are assembled at a particular time. In the specific embodiment, there are half as many sleeves 43–43 as there are seats 31–31, and the sleeves are arranged in a checkerboard pattern corresponding to every other one of the seats, as indicated by comparing FIG. 7 with FIG. 5, so that half of the headers 10—10 comprising every other one are assembled at a time. In order to assemble the other half of the headers, the chamber 50 and carrier 40 are brought down on the tray 30 in an orientation rotated 90° from that illustrated in FIGS. 3 and 10. This method of re-moving closely spaced articles from a work holder in two separated stages is disclosed in applicant's copending application, Serial No. 400,645, filed October 1, 1964, the same date as this application, now Patent No. 3,263,-841, granted August 2, 1966. The increased spacing is highly desirable because of the extremely close spacing of the nests 31–31 in the work holder 30 for the baking operation.

The next step in the process is to remove the chamber 50 and carrier 40 from the work holder 30, with the vacuum on, so that the headers 10–10 are held against the cans 20–20 and are thereby withdrawn from the nests 31–31 as the chamber 50 is removed. After the headers have been fully withdrawn from the seats 31–31, the chamber 50 is reinverted and returned to its initial position (FIG. 8) with the vacuum still on. The headers 10–10 are now supported by the cans 20–20 with the leads 14-14 projecting upward therefrom, generally as viewed in FIG. 11.

Figure 11:
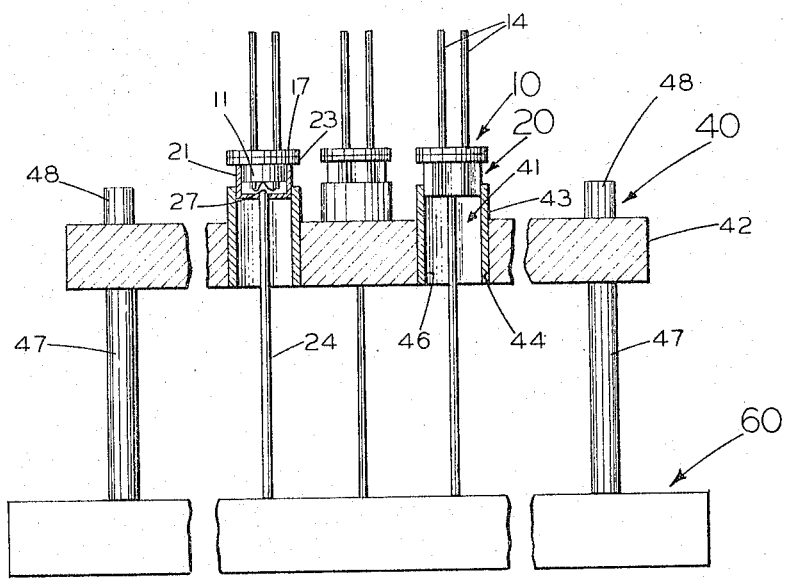
FIG. 11 is an enlarged front view, with portions broken away, of the carrier after release of the vacuum and separation from the vacuum chamber, illustrating the assembled articles in position for removal from the carrier.

After this, the partial vacuum is released by opening the valve 56 and the carrier 40 is removed from the chamber 50 and is set on its legs 47–47 on the table 60, as illustrated in FIG. 11. The carrier legs 47-47 are made a predetermined amount shorter than that length of each tube 24–24 which extends below the tray 42 when the cans 20–20 are fully seated in the sleeves 43–43 (as illustrated in FIG. 8); therefore, as the carrier 40 is set on the table 60, the table pushes up on the tubes 24–24 thus moving the cans 20–20 part way out of the sleeves 43–43 to the position of FIG. 11. In this position, the length of the tubes 24-24 below the tray 42 is equal to the length of the legs 47–47. This partial ejection step facilities individual removal of each assembled header 10 and can 20. The assembled units are then fed individually to a welding machine which functions to weld the flanges 17 and 23 together and seal the transistor unit.

VII.—*Alternative arrangements*

While one specific embodiment of the invention has been described in detail hereinabove, it will be obvious that various modifications may be made from the specific details described without departing from the spirit and scope of the invention. In particular, while the invention is particularly advantageous for use in the mass assembly of transistor headers and tubulated cans of the type described, the principles of the invention may be employed wherever it is desired to assemble two articles where one of the articles has a portion in the shape of an open can with a small hole in the base thereof and the other article has a portion designed to be received in the can. In all such cases, the two-step vacuum principle may be applied first to hold the can against a suitable carrier so that the carrier may be inverted to pick up the article, and second to hold the article against the can to assemble the article and can in the manner described.

What is claimed is:

1. The method of assembling an article and an open can having a small hole in the base thereof, such that a portion of the article is received to a predetermined depth in the can, which method comprises:
   (a) placing the can on a carrier having a seat designed to support the can with the open end up and the base of the can exposed beneath the carrier;
   (b) applying a partial vacuum to the base of the can sufficient to hold the can against the carrier, while permitting a small stream of air to flow through the hole in the base of the can;
   (c) moving the carrier, with the can held thereagainst, into proximity with the article in mutual alignment such that the open end of the can receives the required portion of the article therein, the can and article having portions designed to contact each other and form an air-tight seal when the predetermined depth has been reached, after which the article is held against the can by vacuum drawn through the hole in the can;

(d) returning the carrier to its initial position so that the article is supported in the can and projects upward therefrom;

(e) releasing the partial vacuum; and (f) removing the assembled article and can from the carrier.

2. The method as recited in claim 1, for use with a can having a rigid tube secured to the base thereof and communicating with the hole in the base of the can, further including:

the step of pushing up on the tube from beneath the carrier after step (e), to move the can part way out of the seat in the carrier so as to facilitate removal of the assembled article and can from the carrier.

3. The method of assembling an article and an open can having a small hole in the base thereof, such that a head portion of the article is received in the can, the head portion of the article terminating in an enlarged flange designed to contact an enlarged flange at the open end of the can to limit the reception of the article in the can to a predetermined depth, the article being initially seated in a nest in a work holder with the head portion up, which method comprises:

(a) placing the can on a carrier having a seat designed to support the can by its flange with the open end of the can up and the base of the can exposed beneath the carrier;

(b) applying a partial vacuum to the base of the can sufficient to hold the can against the carrier, while permitting a small stream of air to flow through the hole in the base of the can;

(c) inverting the carrier, with the can held thereagainst, and moving it into proximity with the work holder in mutual alignment such that the open end of the can receives the head portion of the article therein and the flanges contact each other to form an air-tight seal, after which the article is held against the can by vacuum drawn through the hole in the can;

(d) removing the carrier from proximity with the work holder, with the article held against the can, to withdraw the article from the nest;

(e) returning the carrier to its initial position so that the article is supported in the can and projects upward therefrom;

(f) releasing the partial vacuum; and (g) removing the assembled article and can from the carrier.

4. Apparatus for assembling an article and an open can having a small hole in the base thereof, such that a portion of the article is received to a predetermined depth in the can, which apparatus comprises:

(a) a carrier on which the can is placed, the carrier having a seat designed to support the can with the open end up and the base of the can exposed beneath the carrier; and (b) means for applying a partial vacuum to the base of the can sufficient to hold the can against the carrier, while permitting a small stream of air to flow through the hole in the base of the can;

the carrier being moved, with the can held thereagainst by the vacuum, into proximity with the article in mutual alignment such that the open end of the can receives the required portion of the article therein, the can and article having portions designed to contact each other and form an air-tight seal when the predetermined depth has been reached, after which the article is held against the can by vacuum drawn through the hole in the can, the carrier being thereafter returned to its initial position so that the article is supported in the can and projects upward therefrom, after which the partial vacuum is released to permit removal of the assembled article and can from the carrier.

5. The apparatus as recited in claim 4, for use with a can having a rigid tube secured to the base thereof and communicating with the hole in the base of the can, further including:

means for pushing up on the tube from beneath the carrier to move the can part way out of the seat in the carrier after the vacuum has been released, so as to facilitate removal of the assembled article and can from the carrier.

6. Apparatus for assembling an article and an open can having a small hole in the base thereof, such that a head portion of the article is received in the can, the head portion of the article terminating in an enlarged flange designed to contact an enlarged flange at the open end of the can to limit the reception of the article in the can to a predetermined depth, the article being initially seated in a nest in a work holder with the head portion up, which apparatus comprises:

(a) a carrier on which the can is placed, the carrier having a seat designed to support the can by its flange with the open end of the can up and the base of the can exposed beneath the carrier; and (b) means for applying a partial vacuum to the base of the can sufficient to hold the can against the carrier, while permitting a small stream of air to flow through the hole in the base of the can;

the carrier being inverted, with the can held thereagainst by the vacuum, and moved into proximity with the work holder in mutual alignment such that the open end of the can receives the head portion of the article therein and the flanges contact each other to form an air-tight seal, after which the article is held against the can by vacuum drawn through the hole in the can, the carrier being thereafter removed from proximity with the work holder to withdraw the article from the nest and being returned to its initial position so that the article is supported in the can and projects upward therefrom, after which the partial vacuum is released to permit removal of the assembled article and can from the carrier.

7. The apparatus as recited in claim 6, for use with a can having a rigid tube secured to the base thereof and communicating with the hole in the base of the can, wherein:

the carrier comprises a flat tray having depending legs for supporting the same, the legs being a predetermined amount shorter than the length of the tube extending below the tray so that, after the partial vacuum has been released, the tray may be set on its legs on a flat supporting surface which pushes up on the tube until the length of the tube extending below the tray is equal to the length of the legs thus moving the can part way out of the seat in the tray so as to facilitate removal of the assembled article and can from the tray.

8. Apparatus for simultaneously assembling a plurality of articles and a plurality of open cans each having a small hole in the base thereof, such that a head portion of each article is received in one of the cans, the head portion of each article terminating in an enlarged flange designed to contact an enlarged flange at the open end of the can to limit the reception of the article in the can to a predetermined depth, the articles being initially seated in a plurality of regularly spaced nests in a work holder with the head portions up, which apparatus comprises:

(a) a carrier on which a plurality of the cans are placed, the carrier having a plurality of seats designed to support the cans by their flanges with the open ends of the cans up and the bases of the cans exposed beneath the carrier, the seats being arranged in accordance with the spacing of the nests so that a plurality of the cans may be aligned with a plurality of the articles;

(b) a vacuum chamber on which the carrier is placed; and (c) means for applying a partial vacuum to the chamber sufficient to hold the carrier against the chamber and the cans against the carrier, while permitting small streams of air to flow through the holes in the bases of the cans; the chamber being inverted, with the carrier and cans held thereagainst by the vacuum, and moved into proximity with the work holder in mutual alignment such that the open ends of the cans receive the head portions of a plurality of the articles therein and the flanges contact each other to form air-tight seals, after which the articles are held against the cans by vacuum drawn through the holes in the cans, the chamber being thereafter removed from proximity with the work holder to withdraw the articles from the nests and being returned to its initial position so that the articles are supported in the cans and project upward therefrom, after which the partial vacuum is released to permit removal of the carrier from the chamber and of the assembled articles and cans from the carrier.

9. The apparatus as recited in claim 8, for use with articles having cylindrical head portions and enlarged circular flanges which are initially seated in nests constituting cylindrical wells within which the articles are received with the flanges seated at the bottoms of the wells, the cans being cylindrical and having enlarged circular flanges of the same outer diameter as the article flanges, wherein:

the carrier comprises a flat tray having depending legs for supporting the same and for mounting the same in a predetermined alignment on the chamber; and a plurality of cylindrical sleeves are mounted on the tray constituting the seats for supporting the cans, each sleeve having a cylindrical bore of a diameter designed to receive the can and a wall thickness sufficient to support the can flange on the sleeve, the sleeves projecting above the surface of the tray a distance sufficient to permit insertion of the projecting portions of the sleeves into the wells of the work holder to a depth such that the can flanges contact the article flanges to form an air-tight seal.

References Cited by the Examiner
UNITED STATES PATENTS

| | | | |
|---|---|---|---|
| 2,782,574 | 2/1957 | Copold | 269—21 X |
| 2,792,810 | 5/1957 | Maconeghy et al. | 269—21 X |
| 2,858,597 | 11/1958 | Kraemer | 269—21 X |
| 3,046,641 | 7/1962 | Takahashi et al. | 29—203 |
| 3,221,394 | 12/1965 | Pitts | 29—155.5 |

JOHN F. CAMPBELL, *Primary Examiner.*

THOMAS H. EAGER, *Examiner.*